Patented Feb. 16, 1937

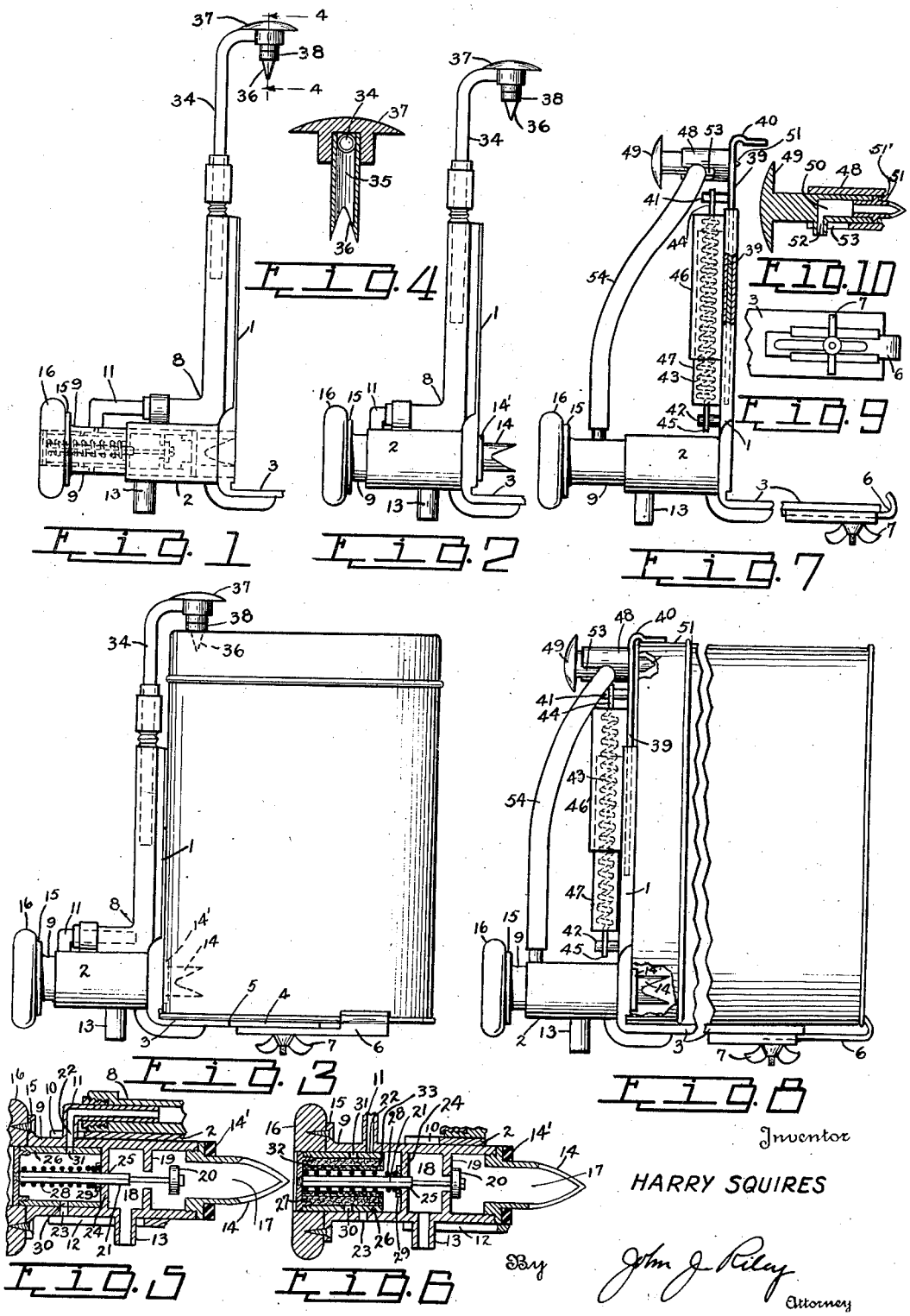

2,070,930

UNITED STATES PATENT OFFICE 2,070,930

DEVICE FOR WITHDRAWING LIQUID FROM METAL CONTAINERS

Harry Squires, Thompsonville, Conn.

Application October 8, 1936, Serial No. 104,716

14 Claims. (Cl. 221—23)

My invention relates to a device for withdrawing liquid from containers and which provides in combination a container opening, venting, and vent filtering means for attachment to and use in connection with the container from which the liquid is to be drawn.

One of the purposes of my invention is to provide means whereby a can of liquid may be tapped and outflow spout inserted simultaneously, and which provides means for preventing contamination of the liquid remaining in the container during the drawing-off period.

Another purpose of my invention is to provide in connection with the outflow means a controlled venting and vent filtering means which is operated synchronously with the outflow means.

Another purpose of my invention is to provide outflow and venting means attachable to the container before it is punctured and which may be allowed to remain in position until the drawing-off of the contents is completed.

These and other purposes of my invention will be made more apparent from the description thereof which follows, and from the drawing, in which—

Figure 1 is a side elevational view of my invention showing its principal features and their position before being attached to the liquid container, the base of the bracket being shown fragmentarily and the liquid valve and liquid exit piercing means shown in dotted lines.

Figure 2 is a side elevational view of my invention showing the external features of Figure 1 in the position assumed when the device is attached to the liquid container and the vent and liquid exit piercing means inserted through the container wall.

Figure 3 is a side elevational view of my invention in the position illustrated in Figure 2, showing the liquid container attached and the container base securing means.

Figure 4 is a sectional view of the vent piercing and top bracket securing means on line 4—4 of Figure 1, viewed in the direction indicated by the arrow.

Figure 5 is a sectional view of the outflow piercing and controlling means and vent controlling means, with the liquid exit valve and vent controlling means in open position.

Figure 6 is a sectional view of the means illustrated in Figure 5 in closed position, and shows the vent filtering means within the valve plunger.

Figure 7 is a side elevational view of a variation of the form of my invention illustrated in Figures 1, 2, and 3, for use on the ends of elongated containers and for drawing off liquid while the container is in horizontal position, being here shown before attachment to the container, and the base clamping means shown fragmentarily.

Figure 8 is a fragmentary side elevational view of the device illustrated in Figure 7 after the attachment to and piercing of the container by the vent and exit piercing means.

Figure 9 is a fragmentary bottom plan view of the base bracket clamping means illustrated in Figures 7 and 8, and which also embodies the principles of the conventional type of clamping means forming a part of the device illustrated in Figures 1, 2, and 3.

Figure 10 is a sectional view of the vent piercing and venting means shown in Figure 7.

Referring to Figures 1, 2, and 3, the bracket for securing the liquid outflow piercing and vent means to the container comprises a flat or concave surfaced vertical strip member 1 adapted to fit close to the surface of the container. At the base of the vertical body member 1 affixed to and registering with an opening therein corresponding with its bore is a cylindrical tubular shell or barrel member 2 angularly disposed thereto and forming the retaining means for the piercing, valve, and vent control mechanism.

Rigidly affixed to the lower portion of said barrel 2 and vertical body member 1, or unitary therewith, is an angularly disposed bracket base member 3, extending oppositely to the barrel member and below the plane thereof, as illustrated.

For use on circular containers in vertical position, this base bracket member 3 and its appendages may be of one of the conventional styles providing for positive engagement and holding of the device to the convex side surface of the container. I have shown one form in Figure 3 which comprises a base member extension including identical arms 4 extending to either side of the container in Y shape, the base or foot thereof comprising the base bracket member 3, and the arms extending from point 5 to either side of the container beyond its widest point. Each of such arms 4 comprises a slidably adjustable arm and clamp 6 and bolt and wing nut 7, as shown in Figures 3, 7, 8, and 9, as means for securing the container against the base of the bracket member 1.

For use on flat sided containers, or circular containers in horizontal position, the single extending arm member 6, slidably affixed to the bracket base 3 with adjustable clamp and bolt 7, as illustrated in detail in Figures 7, 8, and 9, are sufficient.

Referring to Figures 1, 2, and 3, the tubular pipe 8 is affixed to the vertical bracket member 1 and the top surface of the barrel member 2 in the angle formed by such members, and forms a part of the venting means in the manner hereinafter described.

Likewise shown in Figures 1, 2, and 3, and amplified in Figures 5 and 6, the tubular barrel 2 is integral with the bracket, and has an inner bore smoothly fitting the outside diameter of the sleeve 9 comprising the liquid exit piercing member and valve mechanism. Referring particularly to Figures 5 and 6, the top wall of such barrel member 2 is provided with a longitudinal end slot 10 to receive and allow horizontal movement of the vent pipe member 11, the full extent of such horizontal movement of the vent pipe member 11 being shown in Figures 1 and 2, while the bottom wall of the barrel 2 has a similar slot 12 to receive and allow horizontal movement of the spout 13.

Details of the liquid exit piercing and valve mechanism are shown in Figures 5 and 6, comprising the tubular outer sleeve member 9, tubular bifurcated cutter means 14 with peripheral washer 14' of resilient material thereon to prevent leakage, said cutter being threaded or otherwise removably secured, and at the outer end of the sleeve member 9 the annular flange 15 provides means for securing a peripheral knob 16.

The bifurcated cutter means 14 shown in Figures 5 and 6 are, for purposes of illustration, shown in a position involving one-quarter turn from that shown in Figures 1, 2, and 3.

The liquid passage 17 in the cutter means 14 leads to the outflow chamber 18 and its liquid valve, and to the liquid exit through depending spout 13. The valve provides means for controlling flow of liquid through the outflow chamber, the peripheral flange 19 with central bore comprising the seat for the valve closure 20 and passage for the valve push-rod 21. Opposing ports or vents 22, 23 in the top and bottom walls of the sleeve 9 registering with the longitudinal slots 10, 12 in the barrel member 2 are features of the venting means hereinafter described in detail.

A wall 24 separates the liquid outflow chamber 18 from the opposite end of the bore of sleeve 9, which wall comprises a central orifice 25 for the valve push-rod 21. The push-rod is formed of angular material (such as square or diamond-shaped material) and the orifice 25 in the wall 24 conforms to the configuration of the push-rod 21 to form a close-fitting bearing therefor. In this way rotary movement of the rod and leakage are prevented, the advantages of which are hereinafter made apparent.

Means for operating the liquid valve includes the horizontally movable plunger member 26 fitted to the bore of the sleeve member 9, the closure 27 on its outer end providing means for closing the interior from the atmosphere and also for exerting pressure on the push-rod 21 which is affixed to the inner side of said closure. Rotary movement of the plunger 26 is prevented by reason of the angular configuration of the push-rod 21 and the close-fitting orifice in the wall 24.

Reciprocating movement of the plunger member 26 and valve push-rod 21 is facilitated by the spring 28 intermediate the plunger closure 27 and wall 24, a washer 29 of resilient material being placed between the spring 28 and the wall 24 to assist in preventing leakage through the orifice 25 and is held in position by the spring 28.

In the bottom wall of the bore of plunger 26 an orifice or vent 30 is provided in horizontal alignment with the vent inlet 23 in sleeve member 9, while in the top surface thereof another vent 31 is provided in horizontal alignment with the outlet vent 22 in the bore of sleeve 9. Each of said vents in the plunger 26 are positioned so they will register simultaneously with the inlet vent 23 and outlet vent 22 in the sleeve member 9, respectively.

As shown in Figure 5, the plunger member 26 is of such length that when it is pushed forward in the sleeve 9 to the position where such vents register, the forward end of such plunger abuts against the chamber wall 24 to prevent further forward movement.

The purpose of such alignment of the vents just referred to is to control venting connection of the interior of the container with the atmosphere. One of the features of my invention is to prevent bacterial and other contamination of the liquid in the container through the medium of the air that enters the container through the venting means. Contamination is prevented by using a filter in the venting system and through which the air must pass after it enters the vent inlet 23 in the sleeve 9 and again before it enters the vent pipe 11.

I have provided such a medium in the form of a cylinder 32 of filtering wool or other suitable material, said cylinder fitting closely the inner surface of the tubular plunger member 26 and preventing air passage to the container excepting through such filtering material. Such cylinder 32 of filtering material may be reinforced with a core 33 of gauze or other stiff material, as shown in Figure 6.

In this form the filter is removable and renewable merely by detaching the valve washer or closure means 20 from the end of the push-rod 21 so that the plunger 26 may be removed from the sleeve 9 and the filter withdrawn and replaced through the open end of such plunger.

The peripheral knob 16 is secured to the flange 15 on the sleeve member 9, its center bore receiving the outer end of the plunger 26 and providing means whereby pressure may be exerted on the hole piercing means comprised in the sleeve 9 to tap the liquid container.

In the type of my invention illustrated in Figures 1, 2, and 3 the vent pipe 11 is affixed to the sleeve member 9 in its vent outlet 10 and embodies a right angle turn, the horizontal portion thereof being slidably arranged in the horizontal portion of the vent pipe 8 secured to the bracket 1 and barrel 2. Such pipe member 8 thus forms a close-fitting sleeve for the vent pipe 11 and allows for horizontal telescopic movement thereof. Packing around the vent pipe 11 at the entrance to the pipe 8 prevents pressure or air leakage.

Figure 1 shows the position of the vent pipe 11 in the horizontal portion of tube 8 before the piercing operation, such operation carrying it into the slot 10 in the barrel member 2 and into the sleeve formed by the tube member 8, as shown in Figure 2. The slot 12 in the lower side of the barrel 2 allows for similar operation of the depending spout means 13, as also shown in Figures 1 and 2.

The upper end of the vertical portion of the tube member 8 forms the sleeve for the vent pipe member 34, the lower end of which is slidably arranged therein, to allow for vertical telescopic movement. Packing around the vent pipe at the entrance to said tube also prevents leakage of pressure or air at that point from within the venting means.

In the type of my device illustrated in Figures 1, 2, and 3 the top end of the vent pipe 34 is bent at a right angle to the lower portion and comprises a connecting member which acts as clamping means for holding the top portion of the device on the container and means for piercing and venting the top portion of the container.

The vent pipe 34 is connected with the vent chamber 35, as shown in Figure 4, with tubular bifurcated piercing and venting means 36 forming the entrance thereto. The convex knob 37 on the top surface of such member facilitates the application of pressure to the piercing means 36 and handle means to pull it from the position shown in Figures 2 and 3 to that shown in Figure 1, while the washer 38 of resilient material around the outer periphery of the cutter member 36 insures against leakage of internal pressure or air when compressed against the top surface of the container in the manner shown in Figure 3.

Figures 7 and 8 illustrate a variation in the form of my invention to make it specially adaptable for use on the ends of containers lying in horizontal position.

The container piercing means, outflow, valve, and venting control mechanism are identical with that in Figures 5 and 6, with the adjustable clamping means 6, 7 hereinbefore described for attaching the base of the device to the container.

The vertical portion of the bracket member 1 is of flat material arranged with a vertical grooved slot of the conventional type to receive an extension of said bracket comprising a flat strip of material 39 slidably arranged in such grooved slot to allow vertical movement thereof so that its length may be adjusted to containers of various sizes as well as to provide for its extension as a means of removal from the container. At the top of the sliding portion 39 the hook or finger member 40 is provided to clamp over the edge of the container.

Pins 41, 42 in the lower portion of the vertical bracket member 1 and in the upper portion of the vertically movable extension bracket portion 39 provide means for securing the spring 43 by end hooks 44, 45 to said pins, the spring means drawing the bracket extension 39 downwardly in its grooved slot to hold the device on the container in the manner illustrated in Figure 8. Telescoping tubular sleeve members 46, 47 fitted over the spring 43 may be provided in the manner shown.

In this latter type of my device I have also provided a vent piercing and vent chamber means which allows for a horizontal piercing operation in order that the end of the container may be pierced. The cylindrical and tubular barrel member 48 is affixed on and at right angles to the bracket extension member 39, its bore registering with an orifice in the extension member and provides sleeve means for the vent piercing means.

The vent piercing member comprises the knob 49 fitted on the outer end of the tubular valve chamber member 50, with the tubular bifurcated piercing cutting means 51 affixed to the opposite end. A vent 52 is provided in the side wall of said chamber member 50, said vent being so placed that when the cutter has been inserted into the container the vent registers with a corresponding slot in the barrel member 48, and a communicating vent pipe 54 corresponding with the venting means 11, 8, 34 shown in Figure 1, connects the vent chamber 50 with the vent outlet 22 of the sleeve member 9 comprised in the vent controlling mechanism.

As shown in Figures 7 and 8, I have provided for the vent pipe 54 to be of flexible material, such as rubber hose, of such length that there is continuous connection notwithstanding varying positions of the parts resulting from the horizontal movement of the vent and valve controlling means.

Explaining the operation of my device illustrated in Figures 1 to 6 incl., with its various parts in the position shown in Figure 1, the metal container to be tapped is inserted in upright position between the top vent piercing means 36 and the base member 3 of the bracket, and flush against the vertical bracket member 1.

The base of the container is then secured in position by adjustment and bolting of the slidable clamps 6 and wing bolts 7, while downward pressure on the top vent pipe 34 and its appended vent piercing means 36 will force the bifurcated cutter through the top of the container, securing the container in position at that point and at the same time cutting the vent and connecting the vent chamber 35 and vent pipe 34 with the top interior of the container.

Pressure on the knob 16, forcing the sleeve member 9 from its position shown in Figure 1 to that shown in Figures 2 and 3 causes the bifurcated cutter 14 to pierce the container wall near its bottom, providing the liquid outflow means by which the contents may then be drawn through the tubular cutter 14, valve chamber 18, and spout 13.

Outflow of the liquid is prevented, however, when the valve is in the normally closed position shown in Figure 6. Only when pressure on the plunger 26 at its end 27 unseats the valve closure 20, as shown in Figure 5, is it possible for the liquid to escape from the container.

It will also be noted that when the valve closure 20 is in the closed position shown in Figure 6 the vents 30, 31 in the plunger are not in registry with the inlet and outlet vents 22, 23 in the sleeve 9. This prevents the exit of pressure from the container or ingress of air to it, and is especially valuable in preventing flatness in liquids such as beer or other types of carbonated beverages. In the same manner ingress of air to the contents during the time the liquid valve is closed is prevented and contamination avoided. The filter means 32, 33 also removes contaminating matter from air that is admitted through the vent inlet 23 and venting means to the top of the container, and is a further protection against spoilage and contamination.

When the valve is opened by pressure on the plunger 26, the vents in the plunger and sleeve member 9 register and open the venting passage from the vent inlet 23 through the plunger 26 and filter 32, 33, vent outlet 31, 22, and through the connecting vent means 11, 8, 34 and vent chamber 35 to the top of the container, while the liquid flows through the passage 17 in the tubular hole piercing means 14, valve chamber 18, and exit spout 13. The release of the plunger 26 seats the valve closure 20, stopping the flow of liquid, and cuts off the venting passage.

The style of my device illustrated in Figures 7 and 8 is operated in a similar manner, the container being placed on its side and the end inserted between the bracket base member 3 and the top bracket clamp 40. By means of the spring 43, the bracket portions 1, 39 are pulled together and the end of the container securely held at the upper surface, while the slide clamp extension member 6 is fitted along the lower side with the clamp securing the opposite end of the container and, upon fastening of the wing bolt 7 or such other means that may be provided, the lower end of the container is held against the base of the vertical bracket member 1.

Pressure on the knob 49 forces the bifurcated cutter means 51 through the container to the position shown in Figure 8, and provides venting passage from the interior of the container through the vent chamber 52 and vent pipe connection 54 to the vent outlet 22 in sleeve 9.

The liquid outflow means at the base of the bracket is then provided by pressure on the knob 16 controlling the piercing member 14, and the device is in position for operation as hereinbefore described.

When the container is empty the device is removed by releasing the bolt 7 and base clamp 6, withdrawing the piercing means 14 by an outward pull on the knob 16. In the form of my device illustrated in Figure 8 the vent piercing means 51 must then be withdrawn from the container by an outward pull on its knob 49 and the top clamp 40 pulled away from the container, while in the form shown in Figure 3 withdrawal of the vent piercing means 36 by upward pull on knob 37 also releases the top of the container. The device is then ready for reuse upon another container.

Having thus described my invention, I claim:

1. A device for withdrawing liquid from containers, comprising a bracket member, sleeve retaining means extending from the base of said bracket, a sleeve member in said retaining means comprising in combination a vented hole cutting means connecting with a liquid outflow chamber, and a plunger retaining bore, a liquid exit and exit control valve in said outflow chamber, inlet and outlet vents in said retaining bore, unitary valve operating and vent control plunger means in said bore, means for preventing rotary movement of said sleeve and plunger members, and venting means connecting said outlet vent in said retaining bore with a combination vent chamber and vent piercing means.

2. A device for withdrawing liquid from containers, comprising a bracket member, sleeve retaining means extending from the base of said bracket, a sleeve member in said retaining means comprising in combination a vented hole cutting means connecting with a liquid outflow chamber, and a plunger retaining bore, a liquid exit and exit control valve in said outflow chamber, a plunger in said retaining bore, venting means traversing said plunger and registering with inlet and outlet vents in said retaining bore when said valve is opened, unitary valve and plunger operating means, means for preventing rotary movement of said sleeve and plunger members, and venting means connecting said outlet vent in the retaining bore with a combination vent chamber and vent piercing means.

3. A device for withdrawing liquid from containers, comprising a bracket member, a combination vent chamber and vent piercing means affixed to the upper portion of said bracket, sleeve retaining means extending from the base of said bracket, a sleeve in said retaining means comprising in combination a vented hole cutting means connecting with a liquid outflow chamber, and a plunger retaining bore, a liquid exit and exit control valve in said outflow chamber, a plunger in said retaining bore, venting means traversing said plunger and registering with inlet and outlet vents in said retaining bore when said valve is opened, unitary valve and plunger operating means, means for preventing rotary movement of said sleeve and plunger, venting means connecting said outlet vent in the retaining bore with said vent chamber, and filter means in the venting passage.

4. A device for withdrawing liquids from containers, comprising a bracket member, a combination vent chamber and vent piercing means affixed to the upper portion of said bracket, a tubular barrel extending from the base of said bracket member, a longitudinal slot in the top wall of said barrel and a longitudinal slot in the bottom wall thereof, a sleeve in said barrel comprising in combination a vented hole cutting means connecting with a liquid outflow chamber, and a plunger retaining bore, a liquid exit and exit control valve in said outflow chamber, said liquid exit registering with said longitudinal slot in the bottom wall of said barrel, a plunger in said retaining bore, venting means traversing said plunger and registering with inlet and outlet vents in said retaining bore when said valve is opened, said inlet and outlet vents registering with said longitudinal slots in the barrel member, unitary valve and plunger operating means, means for preventing rotary movement of said plunger, vent pipe means extending through said longitudinal slot in the top wall of said barrel and connecting the vent in said retaining bore with the vent chamber, and filter means in the venting passage.

5. A device for withdrawing liquids from containers, comprising a bracket member, a combination vent chamber and vent piercing means affixed to the upper portion of said bracket, a tubular barrel extending from the base of said bracket member, a longitudinal slot in the top wall of said barrel and a longitudinal slot in the bottom wall thereof, a liquid exit piercing member slidably arranged in the bore of said barrel and comprising a sleeve having a combination hole cutting and liquid outflow means on the forward end thereof, a wall within said sleeve forming a liquid outflow chamber connecting with said cutter means, a liquid exit in said chamber registering with said slot in the bottom wall of said barrel, valve and valve closure means in said chamber intermediate said liquid exit and said cutter means, plunger means in the bore of said piercing member opposite said outflow chamber, venting means traversing said plunger means and registering with inlet and outlet vents in the bore of said piercing member, said inlet and outlet vents registering with said longitudinal slots in said barrel, unitary valve closure and plunger operating means, means for preventing rotary movement of said plunger, vent pipe means extending through said longitudinal slot in the top wall of said barrel and connecting said outlet vent in said piercing member with said vent chamber, and filter means in the venting passage.

6. A device for withdrawing liquid from containers, comprising a bracket member, vent piercing means affixed to the upper portion of said bracket, said means comprising a vent chamber connecting with hole piercing means and means providing an exit through said piercing means, a tubular barrel extending from the base of said bracket member, a longitudinal slot in the top wall of said barrel and a longitudinal slot in the bottom wall thereof, a liquid exit piercing member slidably arranged in the bore of said barrel and comprising a sleeve having hole cutting means and means providing an exit through said cutter means on the forward end thereof, a wall within said sleeve forming a liquid outflow chamber connecting with said cutter means, a liquid exit in said chamber registering with the slot in the bottom wall of said barrel, valve and valve closure means in said chamber intermediate said liquid exit and said cutter means, a tubular plunger means in the bore of said piercing member opposite said outflow chamber, a closure on the outer end of said plunger, push-rod means connecting said closure and said valve closure means through the wall of said outflow chamber, spring means on said push-rod between said closure means and the wall of said outflow chamber, means for preventing rotary movement of said plunger means, an air vent in the upper wall of said liquid exit piercing member and an air vent in the lower wall thereof, said vents registering with the longitudinal slots in the tubular barrel, vents in the walls of said plunger member registering with said vents in said piercing member when the liquid valve is open, all of said vents being out of registry and closed by the opposing wall surfaces when said valve is closed, a vent pipe connecting the top vent in said liquid exit piercing member with the vent chamber in said vent piercing member, and filter means in the venting passage.

7. A device for withdrawing liquids from containers, comprising a bracket member, vent piercing means affixed to the upper portion of said bracket, said means comprising a vent chamber connecting with tubular bifurcated cutter means, a tubular barrel extending at right angles from the base of said bracket member, a longitudinal end slot in the top wall of said barrel and a longitudinal end slot in the bottom wall thereof, a liquid exit piercing member slidably arranged in the bore of said barrel and comprising a sleeve having tubular bifurcated cutter means on the forward end thereof, a wall within said sleeve forming a liquid outflow chamber connecting with said cutter, a liquid exit in said chamber registering with the slot in the bottom wall of said barrel, valve and valve closure means in said chamber intermediate said exit and said cutter, tubular plunger means slidably arranged in the bore of said piercing member opposite said outflow chamber, a closure on the outer end of said plunger, an angular push-rod secured at one end to the inner side of said closure and extending therefrom through a close-fitting orifice in the wall of said outflow chamber and secured at its opposite end to said valve closure means, spring means on said push-rod and abutting said closure means and the wall of said outflow chamber, an air vent in the upper wall of said liquid exit piercing member and an air vent in the lower wall thereof, said vents registering with vents in the longitudinal end slots in the tubular barrel, vents in the walls of said plunger member registering with said vents in said piercing member when the liquid valve is open, all of said vents being out of registry and closed by the opposing wall surfaces when said valve is closed, a cylindrical filter means closely fitting the inner surface of said plunger member and covering the vents therein, and a vent pipe connecting the top vent in said liquid exit piercing member with the vent chamber in said vent piercing member, said vent pipe extending through the longitudinal end slot in the tubular barrel member.

8. A device for withdrawing liquid from containers, comprising a bracket member, means for securing said bracket to the liquid container, vent piercing means affixed to the upper portion of said bracket, said means comprising a vent chamber connecting with tubular bifurcated cutter means, a tubular barrel extending at right angles from said bracket member at the base thereof, a longitudinal end slot in the top wall of said barrel and a longitudinal end slot in the bottom wall thereof, a liquid exit piercing member slidably arranged in the bore of said barrel and comprising a close-fitting sleeve having a tubular bifurcated cutter on the forward end and a peripheral knob on the opposite end thereof, a wall within said sleeve forming a liquid outflow chamber connecting with said cutter, a liquid exit in said chamber, valve and valve closure means in said chamber intermediate said exit and said tubular cutter, a close-fitting tubular plunger slidably arranged in the bore of said piercing member opposite said outflow chamber, a closure on the outer end of said plunger, an angular push-rod secured at one end to the inner side of said closure and extending therefrom through a close-fitting orifice in the wall of said outflow chamber and secured at its opposite end to said valve closure means, spring means on said push-rod and abutting said closure and the wall of said outflow chamber, an air vent in the upper wall of said piercing member and an air vent in the lower wall thereof, said vents registering with the longitudinal end slots in the tubular barrel, vents in the walls of said plunger registering with said vents in said piercing member when the liquid valve is open, all of said vents being out of registry and closed by the opposite wall surfaces when said valve is closed, a cylindrical filter means closely fitting the inner surface of said plunger member and covering the vents therein, a vent pipe connecting the top vent in said liquid exit piercing member with the vent chamber in said vent piercing member, and an open spout depending from the exit of said liquid outflow chamber, said vent pipe and spout means extending through the longitudinal end slot in the tubular barrel member.

9. A device for withdrawing liquid from containers, comprising a tubular member having hole piercing means on the forward end thereof, means providing a liquid exit through said piercing means, a wall within said tubular member forming a liquid chamber connecting with said cutter, a liquid exit in said chamber, valve and valve closure means in said chamber intermediate said exit and said cutter, a plunger slidably arranged in the bore of said tubular member opposite said outflow chamber, push-rod means connecting said plunger and said valve closure means through the wall of said outflow chamber, and spring means on said push-rod between said plunger means and the wall of said outflow chamber.

10. A device for withdrawing liquid from containers, comprising a tubular member having a tubular bifurcated cutter on the forward end thereof, a wall within said tubular member forming a liquid outflow chamber connecting with said cutter, a liquid exit in said chamber, valve and valve closure means in said chamber intermediate said exit and said cutter, a tubular plunger slidably arranged in the bore of said tubular member opposite said outflow chamber, a closure on the outer end of said plunger, a push-rod means connecting said closure and said valve closure means through the wall of said outflow chamber, and spring means on said push-rod and abutting said closure means and the wall of said outflow chamber.

11. A device for withdrawing liquid from containers, comprising a tubular barrel, a slot in the wall of said barrel, a liquid exit piercing member in the bore of said barrel and comprising a sleeve having a tubular bifurcated cutter on the forward end thereof, a wall within said sleeve forming a liquid outflow chamber connecting with said cutter, a liquid exit in said chamber registering with said slot in said barrel, valve and valve closure means in said chamber intermediate said exit and said cutter, a tubular plunger slidably arranged in the bore of said piercing member opposite said outflow chamber, a closure on the outer end of said plunger, a push-rod secured at one end to the inner side of said closure and extending therefrom through an orifice in the wall of said outflow chamber and secured at its opposite end to said valve closure means, and spring means on said push-rod and abutting said closure means and the wall of said outflow chamber.

12. A device for withdrawing liquid from containers, comprising a container-holding bracket, a tubular barrel extending at right angles from said bracket at the base thereof, a longitudinal end slot in the wall of said barrel, a liquid exit piercing member slidably arranged in the bore of said barrel and comprising a sleeve having a tubular bifurcated cutter on the forward end and a peripheral knob on the opposite end thereof, a wall within said sleeve forming a liquid outflow chamber connecting with said cutter, a liquid exit in said chamber including an open spout registering with and extending through said longitudinal end slot in said barrel, valve and valve closure means in said chamber intermediate said exit and said tubular cutter, a tubular plunger slidably arranged in the bore of said piercing member opposite said outflow chamber, a closure on the outer end of said plunger, a push-rod secured at one end to the inner side of said closure and extending therefrom through an orifice in the wall of said outflow chamber and secured at its opposite end to said valve closure means, and spring means on said push-rod and abutting said closure means and the wall of said outflow chamber.

13. A device for withdrawing liquid from containers, comprising a combination vent piercing and venting means, filtering means in said venting means, a combination liquid exit piercing and exit valve means, and control means synchronously operating said venting and exit valve means.

14. A device for withdrawing liquid from containers, comprising a combination vent piercing and venting means, a combination liquid exit piercing and exit valve means, and sleeve valve means synchronously operating said venting and exit valve means.

HARRY SQUIRES.